United States Patent Office.

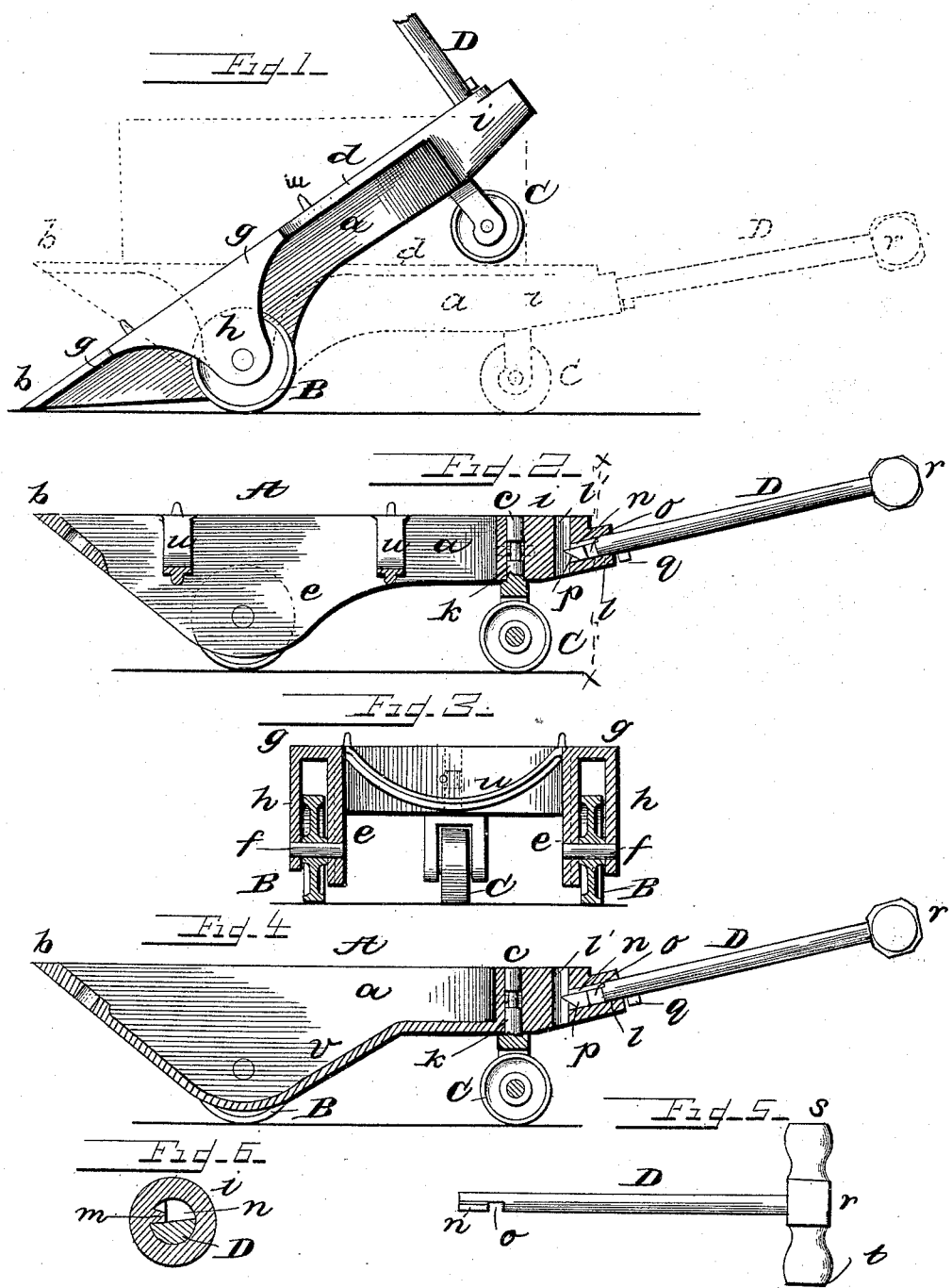

ALBERT A. COUP, OF CLEVELAND, OHIO.

TRUCK.

SPECIFICATION forming part of Letters Patent No. 462,112, dated October 27, 1891.

Application filed February 4, 1891. Serial No. 380,189. (No model.)

*To all whom it may concern:*

Be it known that I, ALBERT A. COUP, a citizen of the United States, residing at Cleveland, in the county of Cuyahoga and State of Ohio, have invented certain new and useful Improvements in Merchandise-Trucks; and I do hereby declare the following to be a full, clear, and exact description of the invention, such as will enable others skilled in the art to which it appertains to make and use the same.

My invention relates to trucks, and has especial reference to that class of trucks used for handling merchandise in warehouses and stores; and it consists in certain improvements in construction, which will be hereinafter described, and particularly pointed out in the claims.

In the accompanying drawings, which form part of this specification, Figure 1 represents a side elevation showing the truck raised to skid merchandise upon in full lines, and in position for moving the truck with its load in dotted lines; Fig. 2, a vertical longitudinal section; Fig. 3, a vertical transverse section taken through the center of the wheels; Fig. 4, a longitudinal section of a modification; Fig. 5, a top plan view of the handle shown in Figs. 1 and 2 detached, and Fig. 6 a section on the line $x\,x$, Fig. 2.

Reference being had to the drawings and the letters thereon, A indicates the body of the truck, which is provided with a vertical web $a$, which extends from the rear end $b$ of the truck around the front end $c$ thereof, and is also provided with a horizontal flange $d$ at the upper edge of the web $a$. The web $a$ is provided with vertical extensions $e$ on each side of the truck, which are cut at an angle on the rear side to form a skid when the truck is elevated, as shown in full lines in Fig. 1. The extensions $e$ form bearings for the short axles $f$, on which the wheels B B are supported. The flange $d$ is extended laterally, as at $g$, and from said extensions depend ears or lugs $h$, in which the outer end of the axles $f$ are supported and said flange $d$. The lug $h$ and the extension $e$ form a housing on each side of the truck for the wheels B B. The wheels B B and their axles are placed in the rear of the longitudinal center of the truck to form a fulcrum, the major portion of the weight of the truck being in front of the wheels and serving as leverage for raising any article to be placed upon the truck.

On the front end of the body A is formed a nose or projection $i$, in which is secured a caster-wheel C upon a vertical spindle $k$, which revolves freely upon its axis, and in said projection is formed an inclined aperture or socket $l$ for the handle D of the truck and a vertical aperture $l'$ to receive the handle when used as a stake to prevent a bale or other package from being pushed off the front end of the truck. In the socket $l$ is a projection $m$, and on the inner end of the handle D is a longitudinal groove $n$ and a transverse groove $o$, which form a bayonet-joint and lock the handle in the socket by a quarter-turn of the latter.

The inner end of the handle is beveled at $p$ to form a screw-driver, and provided with a projection $q$, which latter serves as a fulcrum for the handle when used as a pinch-bar or lever for raising a box, bale, or other package of merchandise preparatory to pushing the rear end of the truck thereunder to "skid" it upon the truck.

The outer end or cross-bar $r$ of the handle forms a hammer having faces $s\,t$, which may be used in packing.

Across the body of the truck may be formed curved bars $u\,u$ for carrying a barrel or other cylindrical body, or the body of the truck may be provided with a bottom $v$, as in Fig. 4.

It will be observed that by placing the wheels B B in the rear of the longitudinal center of the body of the truck the major portion of the weight is supported thereon to the great advantage of the person pulling the truck and that thereby the front wheel C may be readily turned to guide the truck in any direction it may be desired to move it.

From the upper surface of the body A project short pins $w$, for holding boxes or packages laid thereon. The body may be made of any suitable material. Preference is, however, given to cast malleable iron or sheet-iron. In the latter form the body is stamped in suitable dies.

Having thus fully described my invention, what I claim is—

1. A truck-body consisting of a continuous vertical web cut at an angle at its rear end, and a depending lug on each side to form supports for the axles of the wheels.

2. A truck-body consisting of a continuous vertical web, a horizontal flange, a depending lug on each side of the body, and a projection at the front end provided with a socket, in combination with a handle secured in said socket.

In testimony whereof I affix my signature in presence of two witnesses.

ALBERT A. COUP.

Witnesses:
C. G. HURT,
A. RUCKLE.